(No Model.) 2 Sheets—Sheet 1.
A. SCHMID.
ELECTRIC MACHINE.
No. 569,802. Patented Oct. 20, 1896.
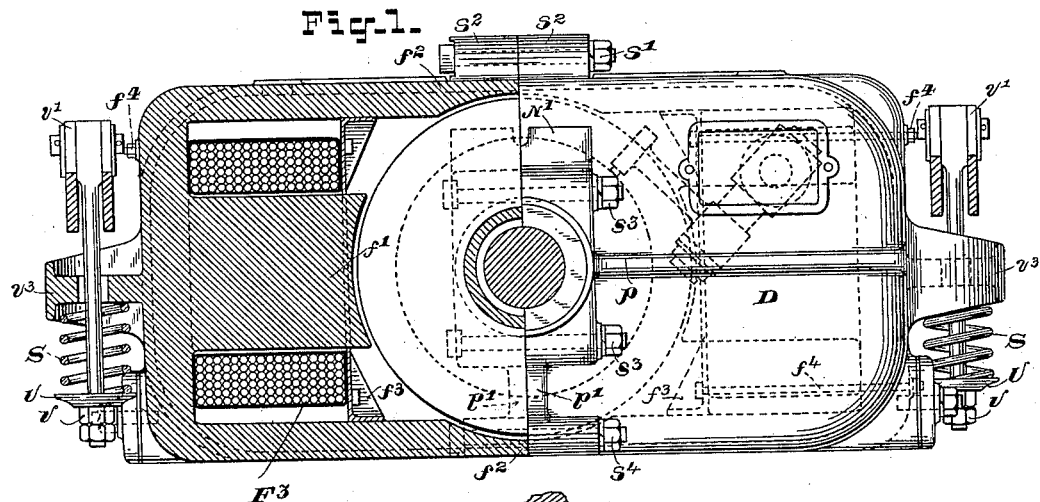
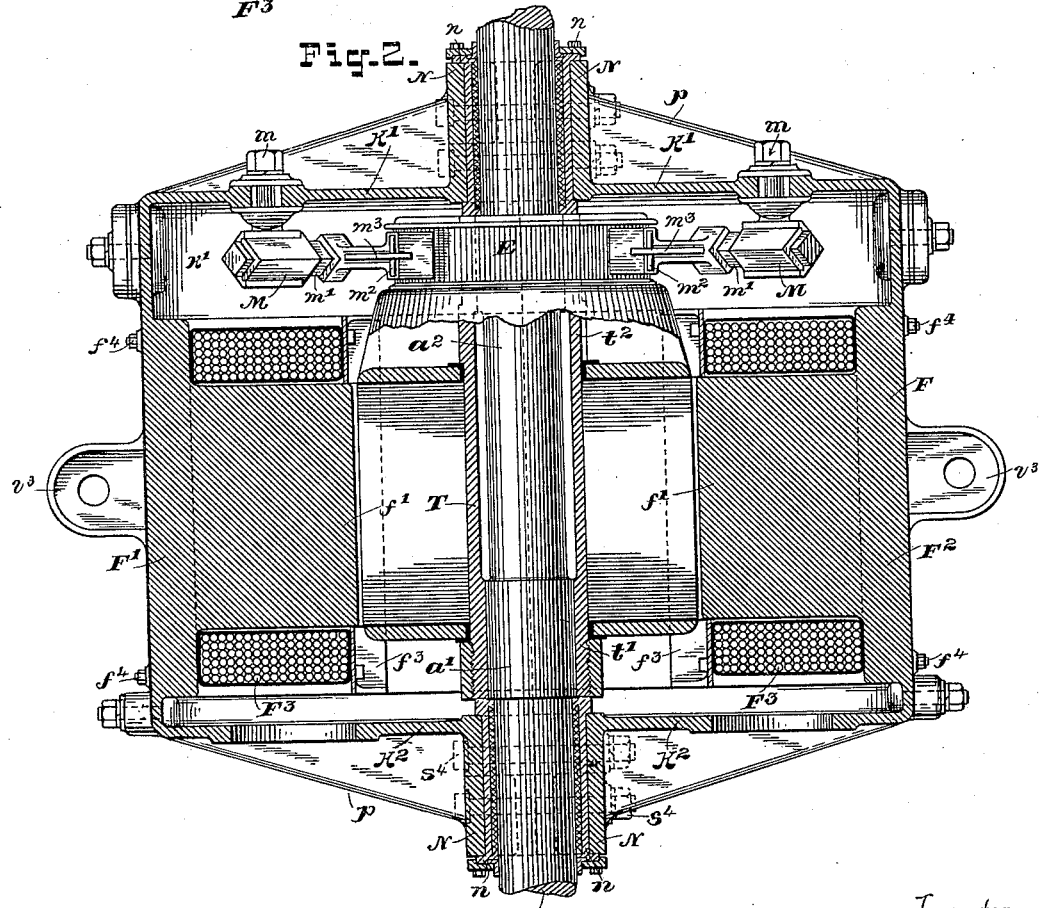
Witnesses
Preston Ewing
Hubert C. Pepper
Inventor
Albert Schmid
By his Attorney
Charles A. Terry

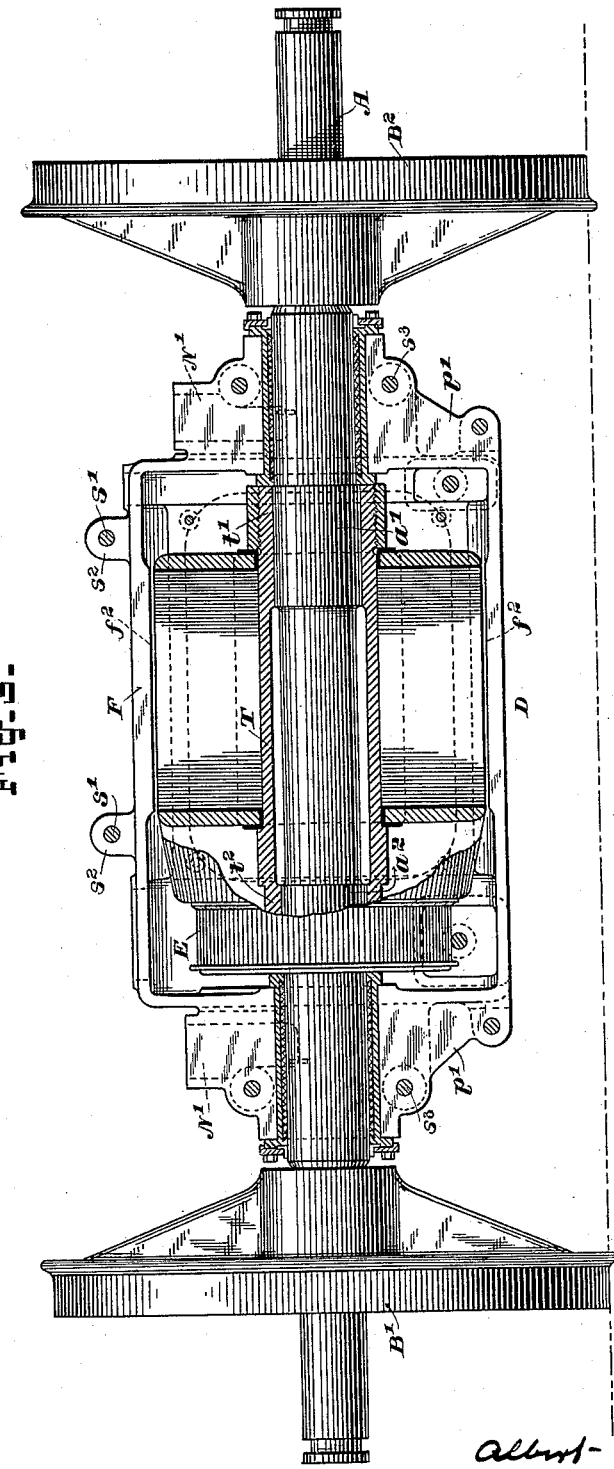

UNITED STATES PATENT OFFICE.

ALBERT SCHMID, OF PITTSBURG, PENNSYLVANIA, ASSIGNOR TO THE WESTINGHOUSE ELECTRIC AND MANUFACTURING COMPANY, OF SAME PLACE.

ELECTRIC MACHINE.

SPECIFICATION forming part of Letters Patent No. 569,802, dated October 20, 1896.

Application filed November 27, 1891. Serial No. 413,174. (No model.)

*To all whom it may concern:*

Be it known that I, ALBERT SCHMID, a citizen of the United States, residing in Pittsburg, in the county of Allegheny and State of Pennsylvania, have invented a new and useful Improvement in Electric Machines, (Case No. 471,) of which the following is a specification.

The invention relates to the construction of electric machines, and especially to the class of electric motors employed for propelling street-cars.

The special objects of the invention are to produce a motor which may be applied directly to the axle of the car and is capable of running at any required speed, and which possesses strength, durability, and simplicity of construction, and is thoroughly protected and shielded.

A motor suited for application to the axle of a car without the employment of reducing-gears must be capable of running at comparatively slow speeds and of exerting and enduring very great torque at starting. For the purpose of obtaining slow speed it is desirable to use multipolar field-magnets, and in order to dispose such a field-magnet in the limited space afforded about a car-axle I have adopted a special construction, as will be hereinafter particularly set forth.

It is desirable that the motors should be well protected from the dust and dirt of the street as well as from rain and snow. It has therefore been customary to shield them as perfectly as possible by means of canvas aprons of various kinds. This plan, however, is necessarily imperfect and unsatisfactory. I have therefore made the field-magnet of such form and general structure that it practically envelops the other parts of the motor and forms a completely iron-clad machine. I usually leave small openings in the enveloping field-magnet at points where they will cause no inconvenience and will permit of proper ventilation and afford access to the commutator-brushes.

Heretofore it has been necessary to gain access to the motors either by removing the car-body or by placing the cars over a pit, so that the motors could be reached from below. I obviate this difficulty by so mounting the motor that it, together with the pair of car-wheels which it drives, may be easily detached from the car-body and the remainder of the truck and rolled out from under the car. The motor may then be repaired in case of necessity, or another motor similarly mounted on car-wheels may be substituted beneath the car.

To support the field-magnet and relieve the car-axle from the dead-weight of the motor as much as may be desirable, the ends of the field-magnet are carried upon equilibrium-springs, which rest upon or depend from the truck-frame. The whole field-magnet may then rock slightly about the armature and the car-axle, and the strain of starting and stopping as well as the jolting will be relieved by the springs.

The invention includes many other features and details of construction, which will be described in connection with the drawings.

In the accompanying drawings, Figure 1 is an end elevation of the motor, partly in section. Fig. 2 is a horizontal section, and Fig. 3 is a vertical section.

Referring to the figures, A represents the axle of a car-truck, and B' B² the corresponding car-wheels. The motor D is mounted directly upon the axle A, so that the axle constitutes the armature-shaft. The armature-core is preferably built up of plates of iron or soft steel, and the armature-coils are placed in grooves in its periphery. The ends of the coils are brought out to the sections of a commutator E. As the armature is to be subjected to great torque care should be taken to mount the armature very securely upon the shaft.

I have found it convenient to build the armature-core upon a sleeve T, which may afterward be pressed upon the axle A. The commutator also is carried by this sleeve. The sleeve is pressed on from the left-hand end of the axle, Fig. 3, and to avoid an unnecessary amount of pressing the sleeve is caused to fit the axle snugly only at the ends, as shown, the central portions of the axle and sleeve being cut away slightly, as shown, and the portion of the axle $a'$ surrounded by the right-hand end $t'$ of the sleeve may be slightly larger than the corresponding portion $a^2$ which receives the left-hand end $t^2$ of the sleeve. The interior diameter of the two ends of the sleeve are made to correspond. This permits the axle to be readily inserted until the right-hand end, Fig. 3, is adjacent to the enlargement $a'$, and the distance along which it is then necessary to press the sleeve is comparatively short. It is also convenient to so proportion the parts that the right-hand end of the sleeve will be started upon the enlargement $a'$ before the left-hand end begins to bind upon the enlargement $a^2$.

The field-magnet core F consists of two castings $F'$ and $F^2$, and has four inwardly-directed poles $f' f' f^2 f^2$. Field-magnet coils $F^3$ are placed upon the two pole projections $f' f'$. The castings when placed together form a complete housing or box around the armature and shut it in, so that it is thoroughly protected. As it is desirable to allow as much clearance as possible between the field-magnet and the ground without making the wheels themselves of too great diameter the core is made of less depth than length and all of the field-magnet coils are applied to the horizontal poles $f' f'$; but as it is desirable to have four poles to admit of slow speed the two other field-magnet poles $f^2 f^2$ are produced above and below the armature and between the poles $f' f'$ without the use of additional coils. The cores of the poles $f^2 f^2$ need not therefore be projected out from the surface of the casting, the latter being formed to approach closely to the armature at these points. The polar tendencies will result at $f^2 f^2$ from the production of the poles at $f' f'$. By this construction very little depth of iron above and below the armature is required. The coils $F^3$ upon the pole projections $f' f'$ are preferably wound in formers and securely insulated before they are placed upon the pole projections. After the coils are in place suitable face-plates $f^3$, of brass or other suitable metal, are placed against the ends of the coils, and these plates are held in position by bolts $f^4$, extending through the casting of the field-magnet core.

For the purpose of completely inclosing the armature and the commutator with its brushes, and also for centering the field-magnet upon the axle, the field-magnet-core castings are made with flanges $K' K^2$ at the ends. Each casting is thus cup-shaped and becomes a box open only upon one side, and when the castings are placed together face to face they form a completely-closed shell. The iron of the flanges serves not only to close the ends of the field-magnet, but also as yokes or back pieces through which lines of force may pass between the poles $f' f^2$. The flanges $K'$ are separated from the end of the armature adjacent to the commutator by a space, as indicated at $k'$, sufficient to admit the commutator E and the brush-holders M, thus completely protecting the commutator and its brushes, as well as the armature. Any suitable form of commutator and commutator-brushes may be employed. In the drawings I have shown the brush-holders as secured to the inner side of the flanges $K'$ by means of bolts $m$. Adjustable supports $m'$ receive carbon brushes $m^2$, which are pressed against the commutator by springs $m^3$.

The flanges $K' K^2$ are formed with longitudinal semicylindrical lugs N for receiving the bushings $n$. These bushings are usually of brass or other non-magnetic material. When the field-magnet is closed, the lugs completely encircle the bushings. Oil-boxes $N'$ may also be formed in the castings for supplying lubricating material to the axle.

The two sections of the field-magnet are bolted together at the top by bolts $s' s'$, the bolts passing through suitable lugs $s^2 s^2$, cast upon the respective sections. Other bolts, $s^3 s^3$, pass through suitable openings in the webs $p' p'$ at the respective ends above and below the bearings, and bolts $s^4 s^4$ are placed near the bottom at the ends.

To insure that the field-magnet shall preserve its center and its proper alinement with the armature, it is desirable that the bearings N N should be of considerable length, and the castings are made with horizontal webs $p p$ and also with vertical webs $p' p$, all of which serve to give proper strength to the structure.

When the motor is applied to the truck, it is desirable to afford it a yielding support, so as to relieve the axle from some of the weight of the motor and from sudden blows and jarring. For this purpose the ends of the field-magnet rest upon cushioning-springs S, which are carried upon or suspended from suitable portions of the truck-frame. By means of these springs the motor is retained in a position of equilibrium when at rest, and when starting and stopping the springs yield somewhat and thus relieve the car from sudden and unpleasant movements. These springs are shown as resting upon plates V, carried by bolts $v$, which extend from cross-bars $v'$ of the truck-frame through lugs $v^3$. The cross-bars are above the lugs $v^3$, and the springs are compressed between the plates V and the lugs $v^3$, so that there is nothing beneath the motor to interfere with its removal from the car-truck when the springs are detached, the axle-boxes opened, and the truck-frame raised.

I claim as my invention—

1. The combination with the armature of an electric motor, of a four-pole field-magnet constructed in two sections, one pole and a fraction of each of two others being carried by each section.

2. A field-magnet for electric machines constructed with four inwardly-directed poles, exciting-coils wound upon two of the poles, the other two remaining unwound, said field-magnet being divided into two sections through the two poles having no coils.

3. A field-magnet core for electric motors for street-cars constructed in two separable sections and having four poles, two horizontal and two vertical, the vertical dimensions of the core being less than the horizontal, and exciting-coils placed upon the horizontal poles only.

4. The combination with the axle of a car-truck, of an electric motor having its armature and its commutator rigid upon said axle, a field-magnet core constructed in two separable parts and forming an inclosing casing for the armature and commutator, and projecting from the axle horizontally in both directions, and springs supporting the respective ends of the field-magnet.

5. A field-magnet for electric motors of rectangular form, and of greater length than depth and having two horizontal poles and two poles at right angles thereto, said field-magnet being divided vertically through the latter poles, and bolts coupling the two sections together.

6. In a car-motor, the combination of an armature rigidly mounted upon the car-axle, a field-magnet vertically divided into two sections and provided with lugs $s^2$, $s^2$, receiving bolts $s'$, $s'$, and completely inclosing the armature, substantially as described.

7. The combination with the axle of a car, of the field-magnet of an electric motor surrounding the same and divided along the line of the axle and provided with bearing-lugs formed at the ends of the field-magnet, also longitudinally divided, and bushings within said bearing-lugs.

8. The combination with the axle of a car, of the field-magnet of an electric motor surrounding the same and provided with bearing-lugs at the respective ends of the field-magnet and with oil-cups above said bearing-lugs formed in said field-magnet casting.

9. In an electric motor, the combination with the car-axle of a sleeve surrounding said axle and having a rigid frictional engagement therewith at its ends and an armature the core of which is built upon said sleeve, substantially as described.

10. In an electric-car motor, an armature-core, and a sleeve upon which the core is built, and a car-axle upon which the sleeve is pressed and upon which it wedges at its respective ends.

11. A car-axle having a slightly-enlarged portion near its two ends, a sleeve pressed upon and tightly fitting said enlarged portions, and a driving-motor having its armature rigidly attached to said sleeves, substantially as described.

In testimony whereof I have hereunto subscribed my name this 24th day of November, A. D. 1891.

ALBERT SCHMID.

Witnesses:
JAMES W. SMITH,
CHARLES A. TERRY.